United States Patent
Konishi

(10) Patent No.: US 9,372,646 B2
(45) Date of Patent: Jun. 21, 2016

(54) STORAGE MEDIUM STORING DEVICE REGISTRATION PROGRAM AND METHOD FOR DEVICE REGISTRATION

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/636,762

(22) Filed: Mar. 3, 2015

(65) Prior Publication Data

US 2015/0254036 A1   Sep. 10, 2015

(30) Foreign Application Priority Data

Mar. 5, 2014  (JP) .................................. 2014-043314

(51) Int. Cl.
*H04W 4/02* (2009.01)
*G06F 3/12* (2006.01)

(52) U.S. Cl.
CPC .............. *G06F 3/1225* (2013.01); *G06F 3/123* (2013.01); *G06F 3/1209* (2013.01); *G06F 3/1279* (2013.01); *G06F 3/1292* (2013.01); *H04W 4/026* (2013.01)

(58) Field of Classification Search
CPC ..... G06F 3/1209; G06F 3/1225; G06F 3/123; G06F 3/1279; G06F 3/1292; G06F 3/1204; G06F 3/1226; G06F 3/1293; H04W 4/008; H04W 4/02; H04W 4/026
USPC ............... 358/1.11–1.18, 400–404; 455/3.06, 455/414.1, 414.2, 41.1, 41.2, 41.3
See application file for complete search history.

(56) References Cited

U.S. PATENT DOCUMENTS

| | | | |
|---|---|---|---|
| 8,553,247 B2 | 10/2013 | Yamauchi | |
| 2003/0142016 A1* | 7/2003 | Pickup | G01S 1/047 342/387 |
| 2004/0137855 A1* | 7/2004 | Wiley | G06F 3/1204 455/88 |
| 2005/0128519 A1 | 6/2005 | Yamauchi | |
| 2007/0198102 A1* | 8/2007 | Umehara | G06F 3/1204 700/32 |
| 2011/0002009 A1* | 1/2011 | Ohashi | G01S 5/06 358/1.15 |
| 2012/0022948 A1* | 1/2012 | Jones | G06Q 30/0267 705/14.64 |
| 2013/0194626 A1* | 8/2013 | Sakurai | G06F 3/1296 358/1.15 |
| 2014/0098249 A1* | 4/2014 | Park | G06T 11/00 348/207.2 |
| 2014/0211254 A1* | 7/2014 | Takeuchi | G06F 3/126 358/1.15 |
| 2015/0062629 A1* | 3/2015 | Tamura | H04N 1/00307 358/1.15 |

FOREIGN PATENT DOCUMENTS

JP         2005-170000 A         6/2005

* cited by examiner

*Primary Examiner* — Chad Dickerson
(74) *Attorney, Agent, or Firm* — Studebaker & Brackett PC

(57) ABSTRACT

A device registration program causes a computer in a mobile terminal to function as a device detecting section, a designated device discriminating section, a display control section, and a device registration section. The device detecting section detects any devices communicable with the mobile terminal. The designated device discriminating section discriminates a device designated according to an orientation of the mobile terminal on the basis of location information and orientation information of the mobile terminal and location information of each of the detected devices. The display control section causes display of a list of icons indicating models of the detected devices and display of an icon of the discriminated device in a different manner than the other icons in the list. The device registration section registers the discriminated device.

7 Claims, 7 Drawing Sheets

STORAGE MEDIUM STORING DEVICE REGISTRATION PROGRAM AND METHOD FOR DEVICE REGISTRATION

INCORPORATION BY REFERENCE

The present application claims priority under 35 U.S.C. §119 to Japanese Patent Application No. 2014-043314, filed Mar. 5, 2014. The contents of this application are incorporated herein by reference in their entirety.

BACKGROUND

The present disclosure relates to storage media storing a device registration program and methods for device registration.

In order to use a given device through a terminal device, a driver for the device must be installed in advance in the mobile terminal. Additionally, identification information inherent to the device must be specified in the terminal device to enable the installed driver to identify the device.

A printer in a certain system transmits a mail to which a printer driver and network setting information are attached to a user's personal computer according to information read from a radio frequency identification (RFID) card through a RFID reader. The personal computer then receives the mail and installs the printer driver and sets up the printer driver in accordance with the network setting information.

SUMMARY

A non-transitory computer readable storage medium according to the first aspect of the present disclosure stores therein a device registration program to be executed by a computer in a mobile terminal in which a device driver is to be installed. The device registration program causes the computer to function as a device detecting section, a designated device discriminating section, a display control section, and a device registration section. The device detecting section detects one or more devices communicable with the mobile terminal. The designated device discriminating section obtains location information and orientation information of the mobile terminal through a positon detecting device and an orientation detecting device that are built into the mobile terminal, obtains location information of the one or more devices from the one or more devices through a wireless communication device built into the mobile terminal, and on the basis of the location information and the orientation information of the mobile terminal and the location information of the one or more devices, discriminates a device designated by a user through orientation of the mobile terminal from the one or more devices. The display control section causes a display device of the mobile terminal to display a list including one or more icons indicating models of the detected one or more devices and display an icon corresponding to the device discriminated by the designated device discriminating section in a different manner than the other icons in the list. The device registration section registers the device discriminated by the designated device discriminating section.

A method for device registration according to the second aspect of the present disclosure is executed by a computer in a mobile terminal in which a device driver is to be installed. The method for device registration includes: detecting one or more devices communicable with the mobile terminal; obtaining location information and orientation information of the mobile terminal through a position detecting device and an orientation detecting device that are built into the mobile terminal; obtaining location information of the one or more devices from the one or more devices through a wireless communication device built into the mobile terminal; discriminating a device designated by a user through orientation of the mobile terminal from the one or more image forming apparatuses on the basis of the location information and the orientation information of the mobile terminal and the location information of the one or more devices; causing a display device of the mobile terminal to display a list including one or more icons indicating models of the detected one or more devices and display an icon corresponding to the discriminated device in a different manner than other icons in the list; and registering the discriminated device.

DETAILED DESCRIPTION

An Embodiment of the present disclosure will be described below with reference to the accompanying drawings.

Figure 1:
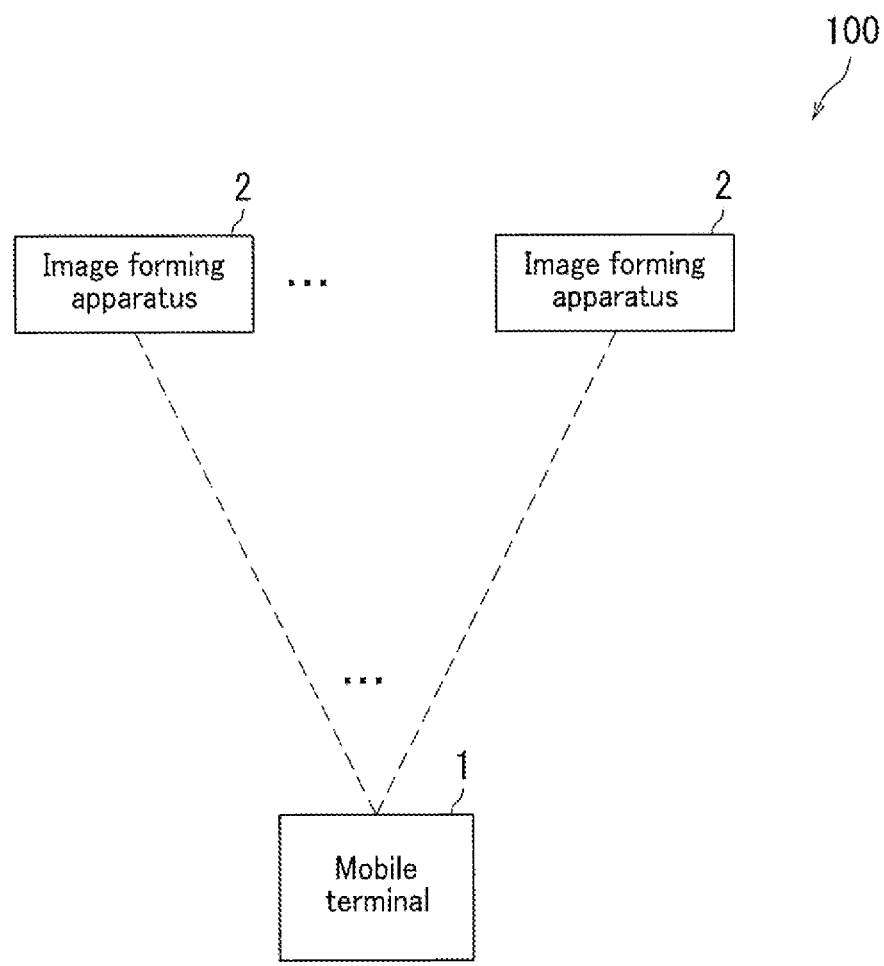
FIG. 1 is a block diagram illustrating a configuration of an image forming system including a mobile terminal in which a device registration program is installed according to an embodiment of the present disclosure.

FIG. 1 is a block diagram illustrating a configuration of an image forming system 100 including a mobile terminal 1 in which a device registration program is installed according to the embodiment of the present disclosure. The mobile terminal 1 may be a smartphone or a tablet personal computer, for example.

The mobile terminal 1 of the image forming system 100 is connectable to one or more image forming apparatuses 2 (devices) through wireless communication. Through the wireless communication, output instructions can be transmitted to any image forming apparatuses 2 registered in the mobile terminal 1 by using a device driver for an image forming apparatus of a given model in the image forming system 100. The wireless communication may be communication using a local area network (LAN) or Bluetooth (registered Japanese trademark), for example. The output instructions may include a print request and a facsimile transmission request, for example.

The image forming apparatuses 2 are devices having an image outputting function such as printers, facsimile machines, or multifunction peripherals. Each image forming apparatus 2 outputs, specifically, prints or transmits an image based on an output instruction from the mobile terminal 1 by performing the image outputting function. When an image forming apparatus 2 receives a request to transmit location information of the image forming apparatus 2 from the mobile terminal 1, the image forming apparatus 2 transmits the location information of its own to the mobile terminal 1.

Figure 2:
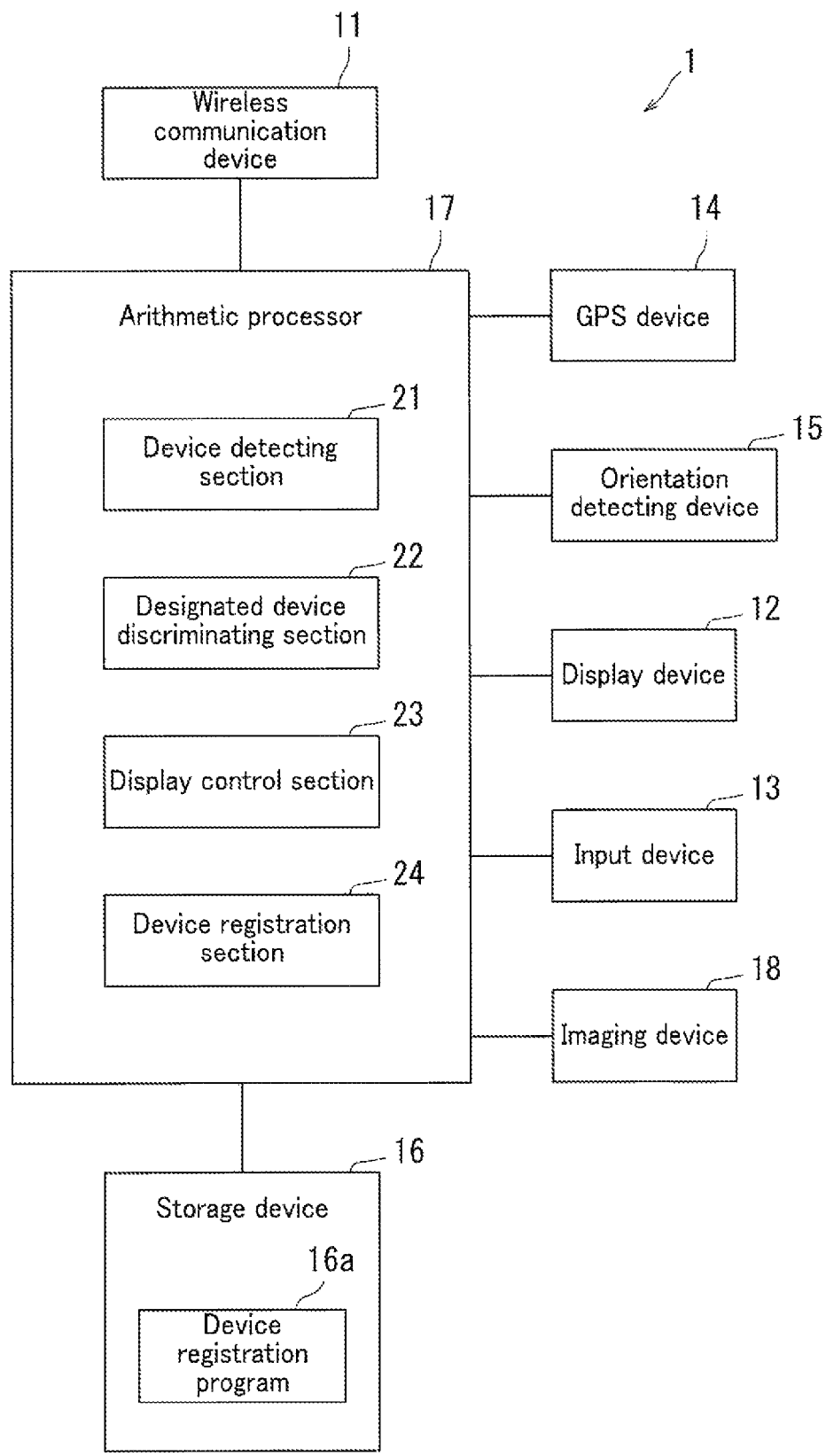
FIG. 2 is a block diagram illustrating a configuration of the mobile terminal in FIG. 1.

FIG. 2 is a block diagram illustrating a configuration of the mobile terminal 1 in FIG. 1.

The mobile terminal 1 includes a wireless communication device 11, a display device 12, an input device 13, a ground positioning system (GPS) device 14 (a position detecting device), an orientation detecting device 15, a storage device 16 (a storage medium), an arithmetic processor 17 (a computer), and an imaging device 18.

The wireless communication device 11 may be, for example, a wireless LAN interface, includes a communication circuit in compliance with a predetermined wireless communication standard, and communicates directly or indirectly with the image forming apparatuses 2.

The display device 12 is a liquid crystal display or the like arranged on the casing of the mobile terminal 1 and displays various types of screens to a user.

The input device 13 is a touch panel or the like arranged on the display device 12 and detects user's operation.

The GPS device 14 is a position detecting device that specifies the absolute location (latitude, longitude, and altitude) of the GPS device 14, that is, the mobile terminal 1, using the GPS.

The orientation detecting device 15 includes a gyro sensor and/or an electronic compass, for example, to detect the posture (e.g., orientation) of the mobile terminal 1.

The storage device 16 is a nonvolatile storage device such as a flash memory that stores programs and data. The storage device 16 stores a device registration program 16a. The device registration program 16a is a program to specify and store setting information of a given image forming apparatus 2 for a device driver for the image forming apparatus 2 that is to be installed in the mobile terminal 1.

The arithmetic processor 17 may be a computer including, for example, a central processing unit (CPU), a read only memory (ROM), and a random access memory (RAM). The arithmetic processor 17 loads a program to the RAM from the storage device 16 or the ROM and causes the CPU to execute it for implementation of various processing sections.

The arithmetic processor 17 executes the device registration program 16a, thereby implementing a device detecting section 21, a designated device discriminating section 22, a display control section 23, and a device registration section 24 in the present embodiment.

The device detecting section 21 detects one or more image forming apparatuses 2 communicable with the mobile terminal 1 through the wireless communication device 11. For example, a wireless LAN is set on each floor. The device detecting section 21 detects any image forming apparatuses 2 in a power-on state that belongs to a wireless LAN on the floor to which the mobile terminal 1 resides.

The device detecting section 21 obtains network identification information (e.g., IP address, media access control (MAC) address, and/or uniform resource locator (URL)) and model information of each of the detected image forming apparatuses 2. Note that the model information can be obtained from each image forming apparatus 2 through a simple network management protocol (SNMP), for example.

The designated device discriminating section 22 obtains location information and orientation information of the mobile terminal 1 through the GPS device 14 and the orientation detecting device 15 that are built into the mobile terminal 1. The designated device discriminating section 22 further obtains location information of each of the detected one or more image forming apparatuses 2 from the one or more image forming apparatuses 2 through the wireless communication device 11 built into the mobile terminal 1. The designated device discriminating section 22 then discriminates an image forming apparatus 2 designated by a user through orientation of the mobile terminal 1 from the one or more image forming apparatuses 2 on the basis of the location information and the orientation information of the mobile terminal 1 and the location information of the one or more image forming apparatuses 2.

In other words, when the user orients the mobile terminal 1 to an image forming apparatus 2 that the user desires to register, the designated device discriminating section 22 discriminates the image forming apparatus 2.

Specifically, the designated device discriminating section 22 determines directions of the mobile terminal 1 toward the one or more image forming apparatuses 2 according to the location information of the mobile terminal 1 and the location information of the one or more image forming apparatuses 2. The designated device discriminating section 22 then discriminates an image forming apparatus 2 toward which direction most closely matches the orientation of the mobile terminal 1 according to the orientation information of the mobile terminal 1 from the image forming apparatuses 2 toward which directions are determined, as an image forming apparatus 2 designated by the user through the orientation of the mobile terminal 1.

In addition, the designated device discriminating section 22 in the present embodiment repeatedly obtains the orientation information of the mobile terminal 1. Upon detection of a change in orientation of the mobile terminal 1, the designated device discriminating section 22 discriminates again an image forming apparatus 2 designated by the user through the orientation of the mobile terminal 1 on the basis of the location information and the orientation information of the mobile terminal 1 and the location information of the one or more image forming apparatuses 2. In other words, upon detection of a change in orientation of the mobile terminal 1, the image forming apparatus 2 discriminated by the designated device discriminating section 22 is updated.

The display control section 23 causes the display device 12 of the mobile terminal 1 to display a list including one or more icons indicating the models of the detected one or more image forming apparatuses 2. The display control section 23 then causes display of an icon corresponding to the image forming apparatus 2 discriminated by the designated device discriminating section 22 in a different manner than the other icons in the list.

Note that the image data of the icons may be stored in advance in the storage device 16 of the mobile terminal 1 in association with the model information. Alternatively, the image data of icons corresponding to the models of the detected image forming apparatuses 2 may be obtained from the image forming apparatuses 2.

The designated device discriminating section 22 in the present embodiment detects a change of an image forming apparatus 2 designated by the user through the orientation of the mobile terminal 1 in the aforementioned manner, and the display control section 23 then changes the icon to be displayed in a different manner in the icon list in conjunction with the change of the designated image forming apparatus 2.

The display control section 23 in the present embodiment enlarges only the icon corresponding to the image forming apparatus 2 discriminated by the designated device discriminating section 22 in the icon list to display it in a different manner than the other icons.

Note that displaying an icon in the different manner than the other icons is displaying the icon in an enlarged scale in the present embodiment, but may be displaying an icon corresponding to the image forming apparatus 2 discriminated by the designated device discriminating section 22 in the icon list in a blinking manner or a manner to change the color of the icon only. For example, only the icon of the discriminated image forming apparatus 2 may be colored, while the other icons may be grayed.

The device registration section 24 registers the image forming apparatus 2 discriminated by the designated device discriminating section 22 in the mobile terminal 1. Specifically, the device registration section 24 stores to the storage device 16 the name of the image forming apparatus 2 input by a user and the network identification information and the model information obtained in the device detecting section 21 as setting information for a device driver for the image forming apparatus 2. Thus, the image forming apparatus 2 is registered in the mobile terminal 1.

The device registration section 24 in the present embodiment registers an image forming apparatus 2 designated by a user through the orientation of the mobile terminal 1 when a predetermined time period (e.g., five seconds) elapses without a change of the image forming apparatus 2 designated by the user through the orientation of the mobile terminal 1. In other words, when the user orients the mobile terminal 1 to an image forming apparatus 2 that the user desires to register for the predetermined time period without moving it, the device registration section 24 registers the image forming apparatus 2.

Figure 3:
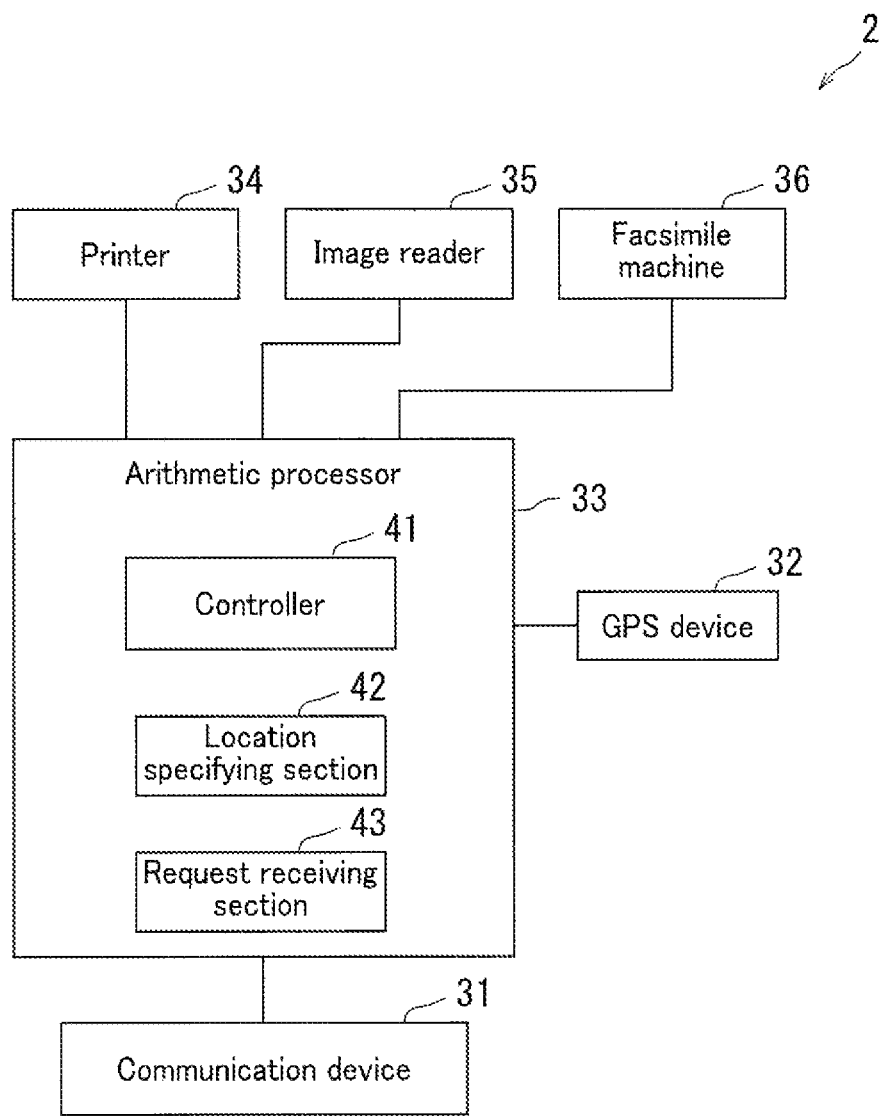
FIG. 3 is a block diagram illustrating a configuration of an image forming apparatus in FIG. 1.

FIG. 3 is a block diagram illustrating a configuration of an image forming apparatus 2 in FIG. 1.

Each image forming apparatus 2 includes, for example, a communication device 31, a GPS device 32, an arithmetic processor 33, a printer 34, an image reader 35, and a facsimile machine 36.

The communication device 31 may be a network interface, for example, and performs data communication with the mobile terminal 1 through a cable network and/or a wireless network.

The GPS device 32 detects the current location of the image forming apparatus 2.

The arithmetic processor 33 may be a computer including a CPU, a ROM, and a RAM. The arithmetic processor 33 implements various processing sections by loading programs stored in the ROM or a storage device (not shown) on the RAM and causing the CPU to execute them.

The arithmetic processor 33 implements a controller 41, a location specifying section 42, and a request receiving section 43.

The controller 41 controls internal devices to execute various processing. The internal devices may be the printer 34, the image reader 35, and the facsimile machine 36, for example.

Note that the printer 34 prints images based on document data received from the mobile terminal 1, for example. The image reader 35 optically reads an original document image from an original document and generates image data of the original document image. The facsimile machine 36 generates and transmits a facsimile signal of an image based on the document data received from the mobile terminal 1, for example. The facsimile machine 36 also receives a facsimile signal from outside and generates an image according to the facsimile signal.

The location specifying section 42 obtains current location information of the image forming apparatus 2 through the GPS device 32.

Each of the image forming apparatuses 2 includes the GPS device 32 in the present embodiment. In the case of an image forming apparatus 2 with no GPS device 32, the location information of the image forming apparatus 2 is stored in advance to a storage device not shown. The location specifying section 42 may accordingly read out the location information from the storage device as the current location information of the associated image forming apparatus 2.

The request receiving section 43 receives various requests including output instructions and requests to transmit location information, for example. Upon receipt of a request to transmit location information, the request receiving section 43 transmits as a response the current location information of the associated image forming apparatus 2 obtained by the location specifying section 42. Upon receipt of an output instruction, the request receiving section 43 sends the output instruction to the controller 41, thereby causing execution of the processing specified by the output instruction.

Figure 4:
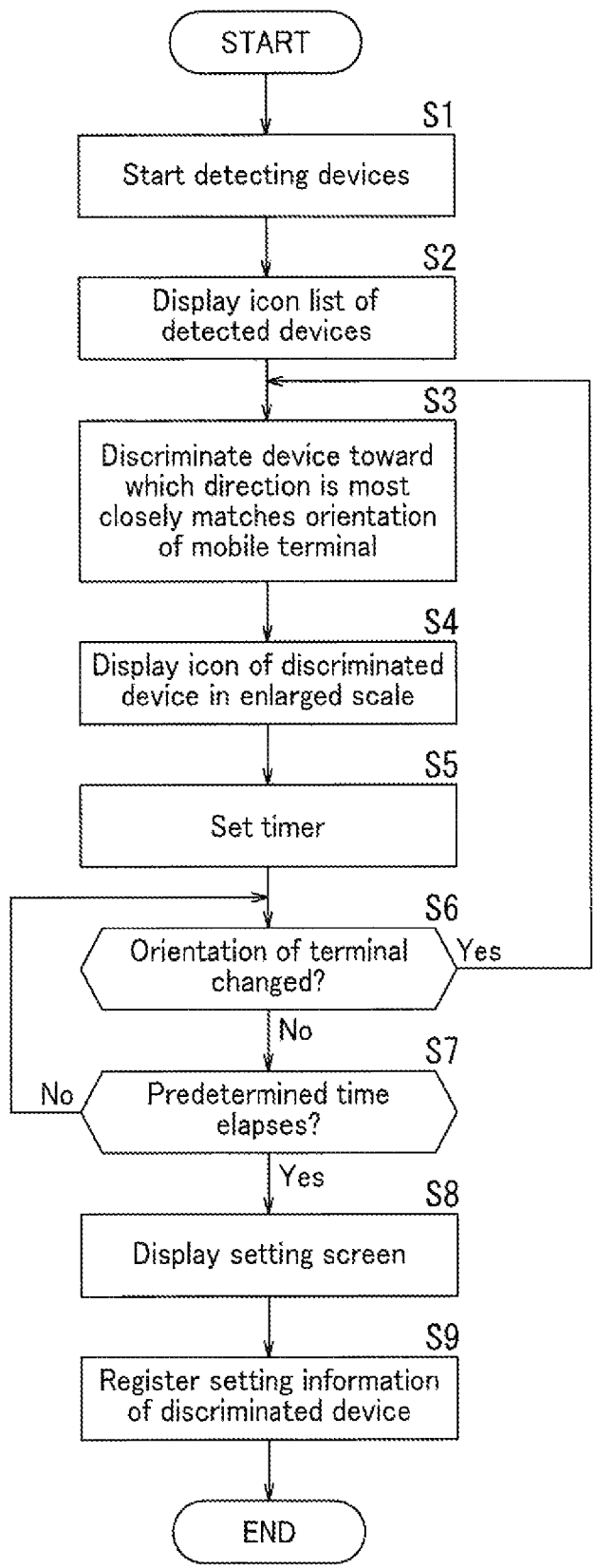
FIG. 4 is a flowchart depicting an operation of the mobile terminal in the system illustrated in FIG. 1.

An operation of the mobile terminal 1 in the image forming system 100 will be described next. FIG. 4 is a flowchart depicting the operation of the mobile terminal 1 in the image forming system 100 in FIG. 1. Each image forming apparatus 2 is referred to as a "device" in FIG. 4.

Figure 5:
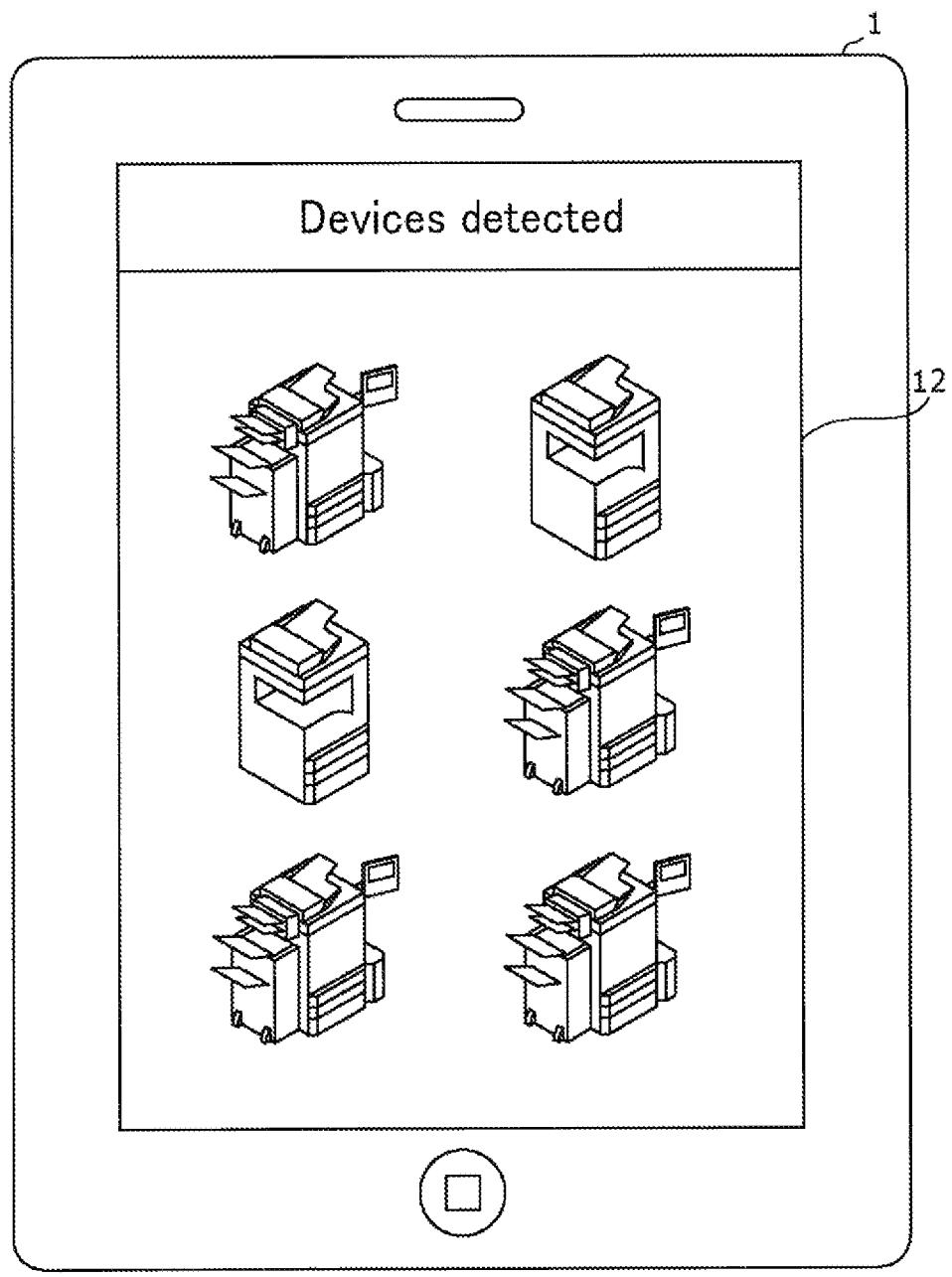
FIG. 5 is a diagram illustrating an example of an icon list displayed in the mobile terminal in FIG. 1.

First, once execution of the device registration program starts according to the user's operation, the device detecting section 21 detects one or more image forming apparatuses 2 communicable with the mobile terminal 1 through the wireless communication device 11 (Step S1). The display control section 23 then causes the display device 12 to display a list of icons of the detected one or more image forming apparatuses 2 (Step S2). FIG. 5 illustrates one example of the icon list displayed in the mobile terminal 1 in FIG. 1. In the example illustrated in FIG. 5, six image forming apparatuses 2 are detected, so that an icon list including six icons is displayed.

When at least one image forming apparatus 2 is detected, the designated device discriminating section 22 obtains the location information and the orientation information of the mobile terminal 1 through the GPS device 14 and the orientation detecting device 15. The designated device discriminating section 22 further obtains the location information of the detected one or more image forming apparatuses 2 from the one or more image forming apparatuses 2 through the wireless communication device 11.

The designated device discriminating section 22 then discriminates an image forming apparatus 2 designated according to the current orientation of the mobile terminal 1 from the one or more image forming apparatuses 2 on the basis of the location information and the orientation information of the mobile terminal 1 and the location information of the one or more image forming apparatuses 2 (Step S3).

The display control section 23 causes display of an icon corresponding to the image forming apparatus 2 discriminated by the designated device discriminating section 22 in a manner to be larger than the other icons (Step S4).

Figure 6:
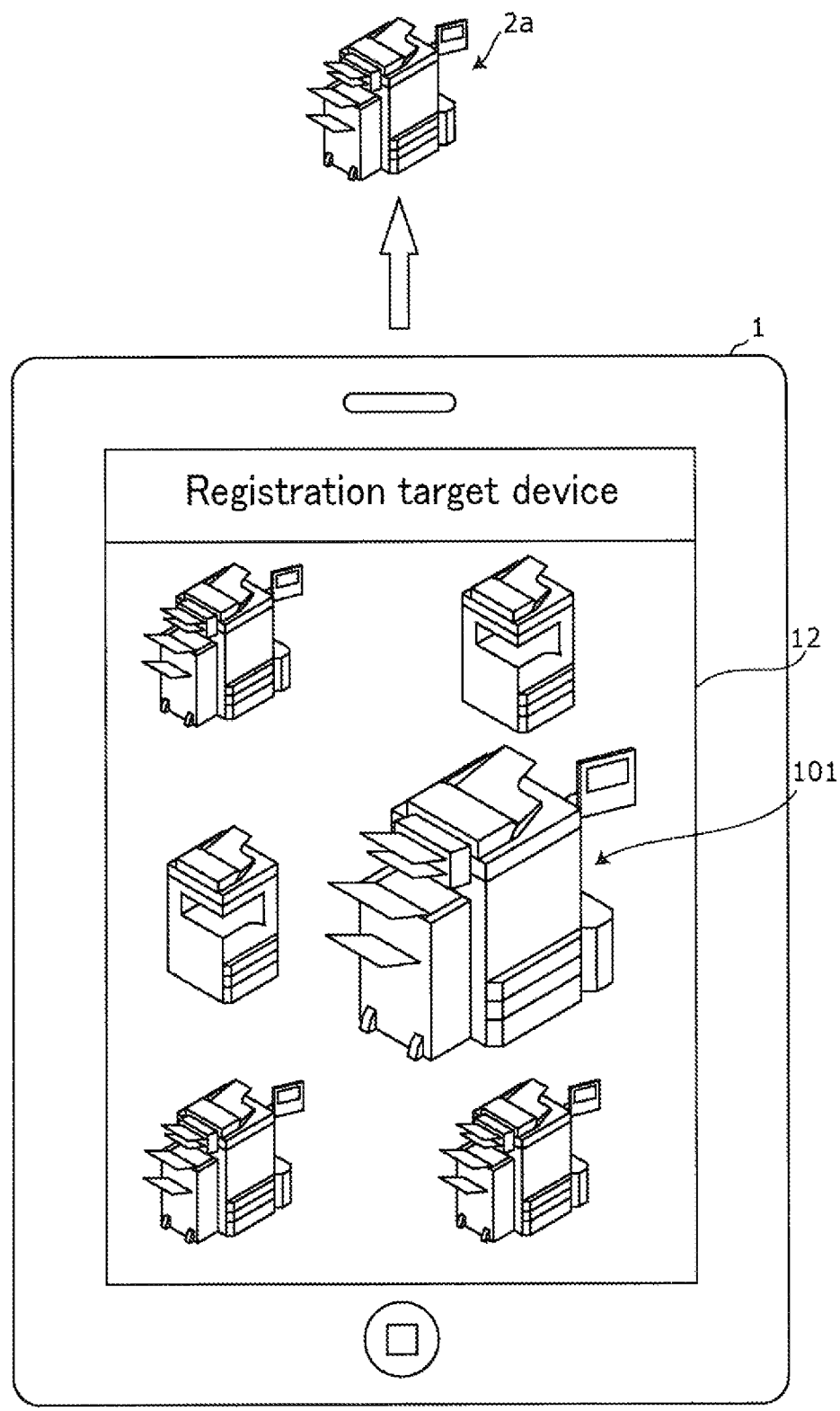
FIG. 6 is a diagram illustrating an example of the state in which an icon corresponding to an image forming apparatus discriminated by a designated device discriminating section is displayed in an enlarged scale in the icon list in FIG. 5.

FIG. 6 illustrates an example of the state in which an icon 101 corresponding to an image forming apparatus 2a discriminated by the designated device discriminating section 22 is displayed in an enlarged scale in the icon list in FIG. 5. For example, as illustrated in FIG. 6, the image forming apparatus 2a located in the direction in which the upper part of the mobile terminal 1 orients is discriminated from the detected image forming apparatuses 2 by the designated device discriminating section 22, and the icon 101 corresponding to the image forming apparatus 2a in the icon list is displayed in an enlarged scale.

Once the icon 101 is displayed in an enlarged scale, the designated device discriminating section 22 sets a timer that times the predetermined time period (Step S5). The designated device discriminating section 22 then repeatedly obtains the orientation information of the mobile terminal 1 to monitor any change in orientation of the mobile terminal 1 and determine whether or not the predetermined time period elapses (Steps S6 and S7).

When the designated device discriminating section 22 detects a change in orientation of the mobile terminal 1 over a predetermined angle before elapse of the predetermined time period, the routine returns to Step S3. The designated device discriminating section 22 then discriminates again an image forming apparatus 2 designated by the user through the orientation of the mobile terminal 1 on the basis of the location information and the orientation information of the mobile terminal 1 and the location information of the one or more image forming apparatuses 2 (Step S3). When the image forming apparatus 2 discriminated by the designated device discriminating section 22 is changed, the display control section 23 causes display of an icon of the image forming apparatus 2 newly discriminated by the designated device discriminating section 22 larger than the other icons in the icon list (Step S4). Further, the designated device discriminating section 22 resets and restarts the timer for timing the predetermined time period again (Step S5).

In this manner, when a user orients the mobile terminal 1 in his/her hand to an image forming apparatus 2 that the user desires to register, the icon of the image forming apparatus 2 is displayed in an enlarged scale. The user can recognize the model that the enlarged icon indicates and check the currently discriminated image forming apparatus 2.

Figure 7:
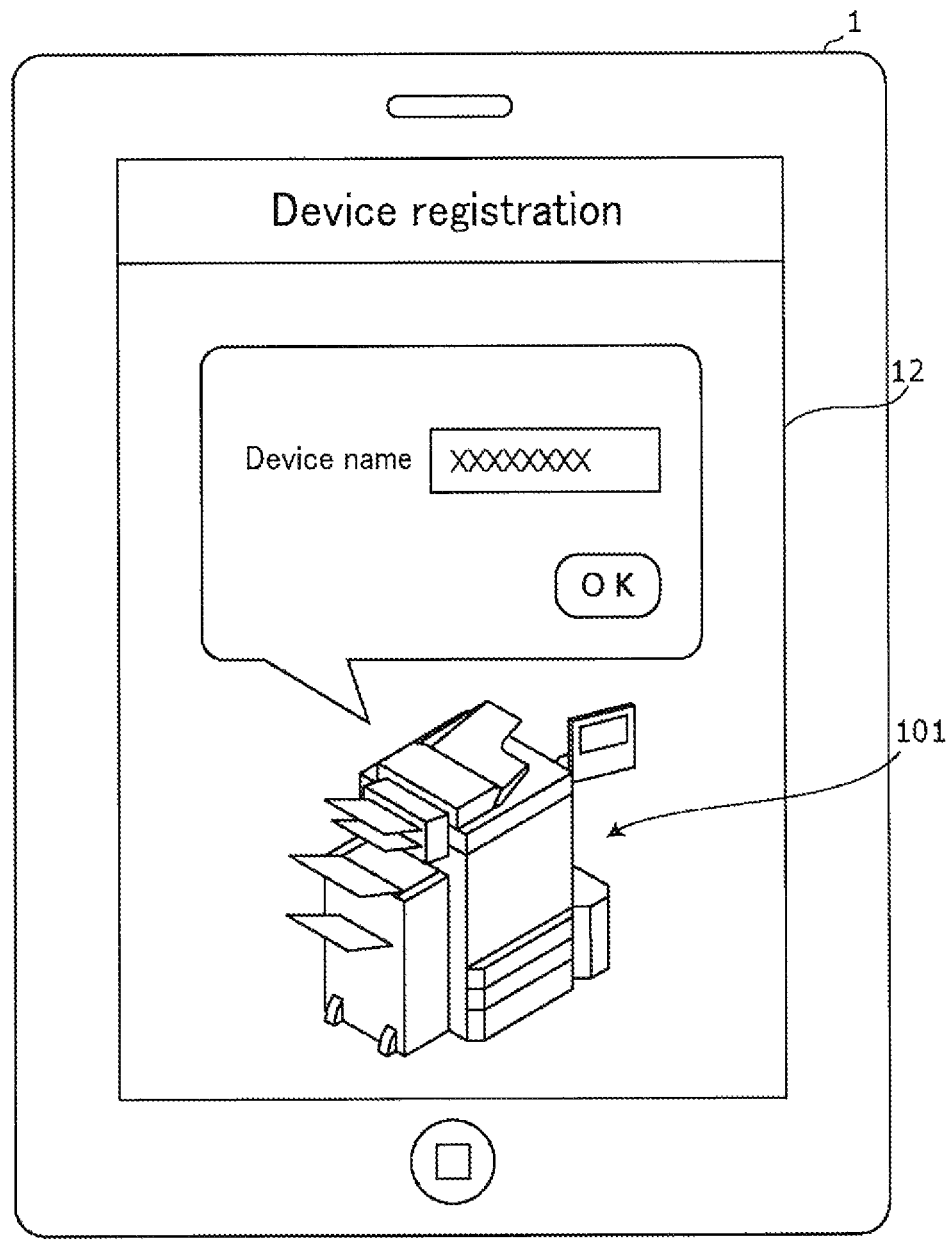
FIG. 7 is a diagram illustrating an example of a setting screen displayed in the mobile terminal in FIG. 1.

On the other hand, once elapse of the predetermined time period is determined, the designated device discriminating section 22 determines the currently discriminated image forming apparatus 2 as an image forming apparatus 2 to be registered. The display control section 23 then causes the display device 12 to display a setting screen (Step S8). FIG. 7 illustrates one example of the setting screen displayed in the mobile terminal 1 in FIG. 1. The setting screen illustrated in FIG. 7 receives a user desiring name to be assigned to the image forming apparatus 2 to be registered. The name may be input through a software keyboard not shown, for example.

The device registration section 24 then stores setting information about the image forming apparatus 2 to be registered (e.g., the name, network identification information, and model information of the image forming apparatus 2) in association with the device driver for the image forming apparatus 2 to be registered (Step S9).

According to the above embodiment, as described above, the device registration program 16a causes the arithmetic processor 17 in the mobile terminal 1 in which the driver for the image forming apparatus 2 is to be installed to function as the device detecting section 21, the designated device discriminating section 22, the display control section 23, and the device registration section 24.

The device detecting section 21 detects any image forming apparatuses 2 communicable with the mobile terminal 1. The designated device discriminating section 22 obtains the location information and the orientation information of the mobile terminal 1 through the GPS device 14 and the orientation detecting device 15. The designated device discriminating section 22 also obtains the location information of the detected image forming apparatuses 2 from the detected image forming apparatuses through the wireless communication device 11. The designated device discriminating section 22 then discriminates an image forming apparatus designated by a user through the orientation of the mobile terminal 1 from the image forming apparatuses 2 on the basis of the location information and the orientation information of the mobile terminal 1 and the location information of the image forming apparatuses 2.

The display control section 23 causes the display device 12 to display a list including icons indicating the models of the detected image forming apparatuses 2 and display the icon corresponding to the image forming apparatus 2 discriminated by the designated device discriminating section 22 in a different manner than the other icons in the list. The device registration section 24 registers the image forming apparatus 2 discriminated by the designated device discriminating section 22.

Thus, the user can intuitively select a desired image forming apparatus 2 even from a plurality of registrable image forming apparatuses 2 and register it at the mobile terminal 1 without need of grasping the identification information of the image forming apparatus 2.

In addition, a method for device registration according to the above embodiment is executed by the arithmetic processor 17 in the mobile terminal 1 in which the driver for an image forming apparatus 2 is to be installed. The method for device registration includes: detecting one or more image forming apparatuses 2 communicable with the mobile terminal 1; obtaining the location information and the orientation information of the mobile terminal 1 through the GPS device 14 and the orientation detecting device 15 that are built into the mobile terminal 1; obtaining the location information of the one or more image forming apparatuses 2 from the one or more image forming apparatuses 2 through the wireless communication device 11 built into the mobile terminal 1; discriminating an image forming apparatus 2 designated by a user through the orientation of the mobile terminal 1 from the one or more image forming apparatuses 2 on the basis of the location information and the orientation information of the mobile terminal 1 and the location information of the one or more image forming apparatuses 2; causing the display device 12 of the mobile terminal 1 to display a list including one or more icons indicating the models of the detected one or more image forming apparatuses 2 and display an icon corresponding to the discriminated image forming apparatus 2 in a different manner than the other icons in the list; and registering the discriminated image forming apparatus 2.

Note that the above embodiment is a preferable example of the present disclosure and should not be taken to limit the present disclosure. A variety of variations and alterations are possible within the scope not departing from the gist of the present embodiment.

For example, an image forming apparatus 2 is registered in the mobile terminal 1 in the above embodiment, but a device of any other type may be registered.

The present disclosure is applicable to installer programs for device drivers, for example.

What is claimed is:

1. A non-transitory computer readable storage medium storing therein a device registration program to be executed by a computer in a mobile terminal in which a device driver is to be installed, wherein the device registration program causes the computer to function as a device detecting section, a designated device discriminating section, a display control section, and a device registration section, the device detecting section detects one or more devices communicable with the mobile terminal, the designated device discriminating section obtains location information and orientation information of the mobile terminal through a positon detecting device and an orientation detecting device that are built into the mobile terminal, obtains location information of the one or more devices from the one or more devices through a wireless communication device built into the mobile terminal, and on the basis of the location information and the orientation information of the mobile terminal and the location information of the one or more devices, discriminates a device designated by a user through orientation of the mobile terminal from the one or more devices, the display control section causes a display device of the mobile terminal to display a list including one or more icons indicating models of the detected one or more devices and display an icon corresponding to the device discriminated by the designated device discriminating section in an enlarged scale in the list, once the icon is displayed in the enlarged scale, the designated device discriminating section sets a timer that times a predetermined time period, when the designated device discriminating section detects a change in orientation of the mobile terminal over a predetermined angle before elapse of the predetermined time period, the designated device discriminating section resets the timer, once the timer determines elapse of the predetermined time period, the designated device discriminating section determines the device being discriminated as a registration target device, when the registration target device is determined, the display control section causes the display device to display a setting screen that is to receive a name to be assigned to the registration target device, and the device registration section registers the device determined as the registration target device by the designated device discriminating section.

2. A non-transitory computer readable storage medium according to claim 1, wherein the designated device discriminating section determines directions of the mobile terminal toward the one or more devices according to the location information of the mobile terminal and the location information of the one or more devices, and discriminates a device toward which direction most closely matches the orientation of the mobile terminal according to the orientation information of the mobile terminal from the devices toward which directions are determined, as the device designated by the user through the orientation of the mobile terminal.

3. A non-transitory computer readable storage medium according to claim 1, wherein the designated device discriminating section repeatedly obtains the orientation information of the mobile terminal, and discriminates again the device designated by the user through the orientation of the mobile terminal from the one or more devices on the basis of the location information and the orientation information of the mobile terminal and the location information of the one or more devices upon detection of a change in orientation of the mobile terminal.

4. A non-transitory computer readable storage medium according to claim 3, wherein the designated device discriminating section detects a change of the device designated by the user through the orientation of the mobile terminal, and the display control section changes the icon to be displayed in the enlarged scale in the list in conjunction with the change of the designated device.

5. A non-transitory computer readable storage medium according to claim 1, wherein the device registration section stores to a storage device setting information about the device to be registered in association with a driver for the device to be registered.

6. A non-transitory computer readable storage medium according to claim 1, wherein the devices are image forming apparatuses.

7. A method for device registration to be executed by a computer in a mobile terminal in which a device driver is to be installed, comprising:

detecting one or more devices communicable with the mobile terminal;

obtaining location information and orientation information of the mobile terminal through a position detecting device and an orientation detecting device that are built into the mobile terminal;

obtaining location information of the one or more devices from the one or more devices through a wireless communication device built into the mobile terminal;

discriminating a device designated by a user through orientation of the mobile terminal from the one or more devices on the basis of the location information and the orientation information of the mobile terminal and the location information of the one or more devices;

causing a display device of the mobile terminal to display a list including one or more icons indicating models of the detected one or more devices and display an icon corresponding to the discriminated device in an enlarged scale in the list;

setting once the icon is displayed in an enlarged scale, a timer that times a predetermined time period:

resetting the timer when a change in orientation of the mobile terminal over a predetermined angle is detected before elapse of the predetermined time period;

determining once elapse of the predetermined time period is determined, a device being discriminated as a registration target device;

causing the display device to display a setting screen that is to receive a name to be assigned to the registration target device: and registering the device determined as the registration target device.

* * * * *